(12) United States Patent
Yacoub

(10) Patent No.: US 8,685,140 B2
(45) Date of Patent: Apr. 1, 2014

(54) PARTICLE FILTER AND A METHOD FOR OPERATING A PARTICLE FILTER

(75) Inventor: Yasser Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 608 days.

(21) Appl. No.: 12/723,068

(22) Filed: Mar. 12, 2010

(65) Prior Publication Data

US 2010/0229718 A1 Sep. 16, 2010

(30) Foreign Application Priority Data

Mar. 13, 2009 (DE) .................. 10 2009 001 538

(51) Int. Cl.
*B01D 50/00* (2006.01)
*B01D 39/14* (2006.01)
*B01D 39/06* (2006.01)
*B01D 24/00* (2006.01)
*B01D 46/46* (2006.01)
*F01N 3/00* (2006.01)

(52) U.S. Cl.
USPC ........ 95/1; 55/522; 55/523; 55/524; 422/169; 422/170; 422/171; 422/172; 422/177; 422/178; 422/179; 422/180; 422/181; 422/182; 60/297

(58) Field of Classification Search
USPC ............ 55/522–524; 422/169–172, 177–182; 60/297; 95/1
See application file for complete search history.

(56) References Cited

U.S. PATENT DOCUMENTS

| 4,897,096 | A | * | 1/1990 | Pischinger et al. | 55/283 |
| 5,651,248 | A | * | 7/1997 | Kawamura | 60/286 |
| 6,090,172 | A | * | 7/2000 | Dementhon et al. | 55/282.3 |
| 6,107,603 | A | * | 8/2000 | Dementhon et al. | 219/202 |
| 6,978,602 | B2 | * | 12/2005 | Ohtake et al. | 60/295 |
| 2004/0052699 | A1 | * | 3/2004 | Molinier et al. | 422/180 |
| 2008/0110341 | A1 | * | 5/2008 | Ketcham et al. | 95/274 |
| 2009/0038294 | A1 | * | 2/2009 | Anderson et al. | 60/295 |

FOREIGN PATENT DOCUMENTS

| DE | 3608801 A1 | 9/1987 |
| DE | 69503203 T2 | 1/1999 |
| DE | 20117659 U1 | 1/2002 |
| DE | 10122739 A1 | 11/2002 |
| JP | 7310532 A | 11/1995 |

* cited by examiner

*Primary Examiner* — Amber Orlando
(74) *Attorney, Agent, or Firm* — Julia Voutyras; Alleman Hall McCoy Russell & Tuttle LLP

(57) ABSTRACT

The present invention relates to a particle filter and a method for operating a particle filter. The particle filter includes at least one filter portion forming an open filter system and also a heatable particle collecting element which is arranged adjacently to this filter portion and comprises a material having temperature-dependent electrical resistance. The method for operating the particle filter includes heating the particle collecting element and measuring the electrical resistance of the particle collecting element to determine whether to regenerate the particle filter.

19 Claims, 2 Drawing Sheets

PARTICLE FILTER AND A METHOD FOR OPERATING A PARTICLE FILTER

CROSS REFERENCE TO PRIORITY APPLICATION

The present application claims priority to German Patent Application No. 102009001538.8, filed Mar. 13, 2009, titled "A PARTICLE FILTER AND A METHOD FOR OPERATING A PARTICLE FILTER", the entire contents of each of which are incorporated herein by reference.

TECHNICAL FIELD

The present invention relates to a particle filter and a method for operating a particle filter.

BACKGROUND AND SUMMARY

The invention may be applied in direct-injection motor vehicles having an exhaust gas after-treatment device in the form of a particle filter, in particular a diesel particle filter (DPF), for storing soot emissions.

In order to estimate the charging or quantity of particles stored in a particle filter, an emission model for the supplied gas is conventionally taken as a basis in situations in which it is not possible to directly measure the stored charging.

Although, in the case of a diesel particle filter, in principle a differential pressure sensor (DP sensor) is conventionally used to estimate the soot charge, it can occur, depending on the charging state, that there is no longer any correlation between the differential pressure and the soot charge, as this correlation typically decreases as charging increases. Accordingly, at the same time as estimating the soot charge, a model is applied for the supplied gas containing the soot particles in order to determine the soot charge via an additional route or as a secondary estimation, the soot charge being furthermore estimated primarily via the differential pressure sensor. The estimated soot rate is then corrected with regard to the passive/active soot regeneration and integrated for estimating the soot charge.

However, the possibilities for measuring the soot rate in the exhaust gas or at the output of the engine by means of vehicle-side (on-board) sensors are limited and have not yet reached a mature stage of development. In addition, such measuring of the soot rate leads to an increase in the costs as a consequence of the additionally required sensor.

Against the foregoing background, it is an object of the present invention to provide a particle filter and a method for operating a particle filter, which allow, at comparatively low cost, the prompt initiation of regeneration of the particle filter or robust detection of the quantity of particles stored in the particle filter.

This object is achieved by the method and device according to the present invention.

A method according to the invention for operating a particle filter having at least one filter portion forming an open filter system and also a heatable particle collecting element which is arranged adjacently to this filter portion and comprises a material having temperature-dependent electrical resistance, includes the steps of heating the particle collecting element; and measuring the electrical resistance of the particle collecting element.

As a consequence of the heating of the particle collecting element, soot particles, which accumulate on the particle collecting element after charging of the filter portion forming the open filter system, are regenerated or burned. If now in this case the amount of soot accumulated on the particle collecting element exceeds a predefined threshold value, this may be determined by way of a decrease in the electrical resistance of the particle collecting element, allowing, at low cost, the prompt initiation of regeneration of the particle filter or robust detection of the quantity of particles stored in the particle filter.

According to a preferred embodiment, the particle filter has, in addition to the filter portion forming an open filter system, a further filter portion forming a closed filter system.

Preferably, the further filter portion forming the open filter system is arranged in an edge region of the particle filter. This has the advantage that the particle collecting element is charged last with soot particles, as the preferred flow path runs first through the central region of the particle filter, before the flow is guided to the edge region of the particle filter.

According to a preferred embodiment, the particle collecting element has a grid-like geometry for efficient accumulation of the particles.

According to a further aspect, the invention relates to a particle filter for filtering particles from the exhaust gas stream of an internal combustion engine, the particle filter having at least one filter portion forming an open filter system and also a heatable particle collecting element which is arranged adjacently to this filter portion and comprises a material having temperature-dependent electrical resistance.

Further embodiments may be inferred from the description and also the sub-claims.

DETAILED DESCRIPTION

The invention will be described hereinafter in greater detail based on an exemplary embodiment and with reference to the appended illustrations.

Figure 1:
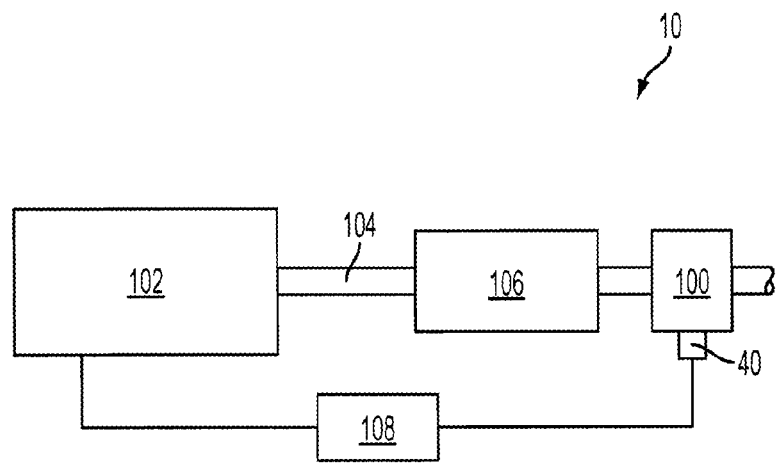
FIG. 1 shows a schematic diagram of an example internal combustion engine.

FIG. 1 shows a schematic diagram of an example direct injection internal combustion engine 10. Engine 10 may be a diesel engine. Engine 10 comprises an engine block 102 that may include a plurality of cylinders or combustion chambers to combustion fuel, such as diesel. Exhaust gas from the combustion may be discharged via an exhaust passage 104 to an after-treatment system. The after-treatment system may include an emission control device 106, such as a three-way catalyst or a NOx trap or combinations thereof, and a particle filter 100.

Particle filter 100 is shown including a sensor element 40 to detect the operating condition of particle filter 100. Sensor element 40 is shown communicated with an engine control system 108. Engine control system 108 can control the operation of particle filter 100, such as regeneration of particle filter 100 or heating of a particle collecting element (not shown and will described in detail below) based on the information from sensor element 40. Control system 108 may include computer readable medium having instructions or code thereon for carrying out various routines or methods, including those described herein such as with regard to FIG. 3

Figure 2A:
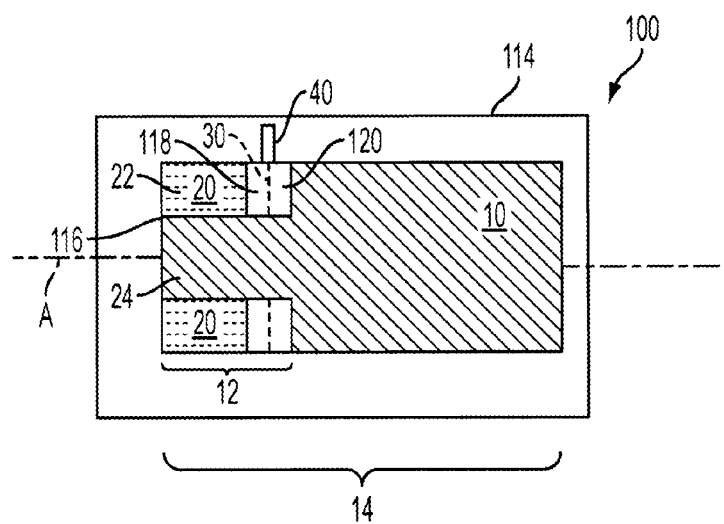
FIG. 2A shows a cross-sectional view of a particle filter along its longitudinal axis.

FIG. 2A shows a cross-sectional view of a particle filter along a longitudinal axis A. A particle filter 100 is shown to have a first filter portion 10 forming a closed filter system and a second filter portion 20 forming an open filter system, the second filter portion 20 being arranged in an edge region 22 or in a periphery of the particle filter 100. In the depicted embodiment, the first filter portion 10 includes a first section 12 and a second section 14. The first section 12 has a cross-sectional area smaller than a cross-sectional area of the second section 14. The second filter portion 20 may be disposed to enclose a portion of the first section 12 of the first filter portion 10.

The second filter portion 20 forming the open filter system is able to store soot particles until a threshold value for the charging is reached. When the threshold value is reached, a breakthrough of the soot particles occurs. As in a conventional system, prompt regeneration is required in order to prevent damage to the particle filter 100 as a consequence of excessively high regeneration temperatures.

Located adjacently to the second filter portion 20 forming the open filter system is a particle collecting element 30 which is embodied in a grid-shaped manner and on which the soot particles contained in the exhaust gas stream accumulate. This particle collecting element 30 is electrically heatable in order to introduce regeneration of the surface accumulating the soot particles when the second filter portion 20 forming the open filter system is completely charged. The particle collecting element 30 include or is formed of a material, the electrical resistance of which is temperature-dependent. The particulate collecting element 30 may be one portion of particulate filter 100, in addition to portions 10 and 20.

Figure 2B:
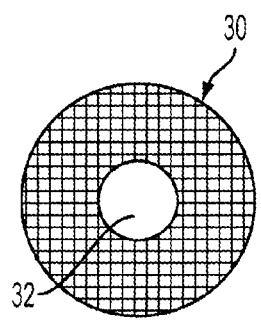
FIG. 2B shows a cross-sectional view of a particle collection element of a particle filter according to one embodiment of the present invention.

FIG. 2B shows a cross-sectional view of the particle collecting element 30. In the depicted embodiment, the particle collecting element 30 includes an opening 32 and has a grid-like geometry.

During each engine start or before the engine begins to run, the particle collecting element 30 is heated, and the electrical resistance of the particle collecting element 30 is measured by means of a sensor element 40. As a consequence of the heating of the particle collecting element 30, soot particles, which accumulate on the particle collecting element 30 after charging of the second filter portion 20 forming the open filter system, are regenerated or burned. If now in this case the amount of soot accumulated on the particle collecting element 30 exceeds a predefined threshold value, a decrease in the electrical resistance of the particle collecting element 30 may be determined.

Such evidence of a decrease in the electrical resistance of the particle collecting element 30 serves in accordance with the invention as a measure or indication of the fact that the second filter portion 20 forming the open filter system is charged with soot particles. If this is the case, regeneration of the entire particle filter 100 (i.e. both of the first filter portion 10 and of the second filter portion 20) is initiated, or caused.

The arrangement of the second filter portion 20 forming the open filter system in the edge region 22 of the particle filter 100 ensures that the particle collecting element 30 is charged last with soot particles, as the preferred flow path (i.e. the path of the lowest flow resistance) runs first through a central region 24 of the particle filter 100, before the flow is guided to the edge region 22 or the periphery of the particle filter 100. The particle filter 100 is in this case preferably designed in such a way that the flow resistance in the second filter portion 20 forming the open filter system is (in the cleaned state) greater than that of the first filter portion 10 forming the closed filter system.

While FIGS. 2A and 2B are schematic, they do show relative proportions and sizing of the various components and sections as illustrated.

Figure 3:
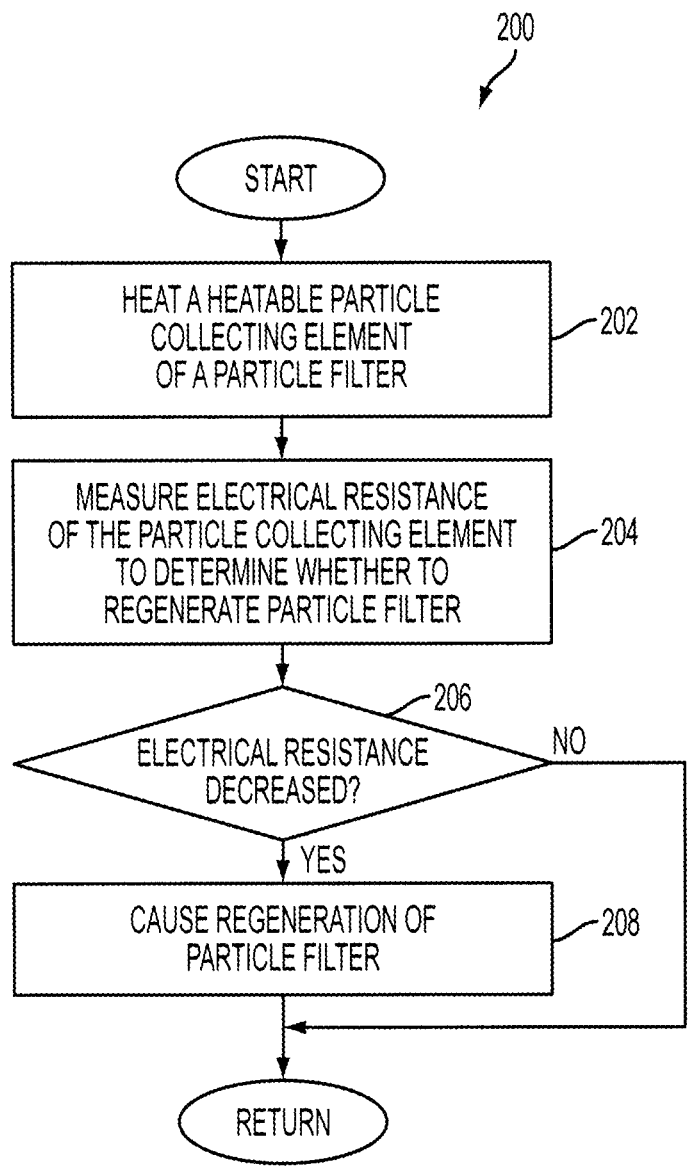
FIG. 3 is a flowchart illustrating a method to operate a particle filter.

FIG. 3 is a flowchart illustrating a method to operate a particle filter. At 202, the method includes heating a heatable particle collecting element of the particle filter. Heating may be initiated during each engine start or before the engine begins to run. The heating may include electrical heating. Further, while the heatable particle collecting element is heated, the remaining portions of the particulate filter are not heated, or heated to a lesser amount, such that regeneration of the remaining portions is not carried out. At 204, the method includes measuring an electrical resistance of the particle collecting element to determine whether to regenerate the entire particle filter. In some embodiments, regeneration of the particle filter may be caused as a function of the measured electrical resistance of the particle collecting element. As such, at 206, it may be determined whether the electrical resistance is decreased. If the answer at 206 is no, the method may return to 202 for the subsequent cycle. If the answer at 206 is yes, the method proceeds to 208 to initiate or cause regeneration of the entire particle filter.

In one example, it may be possible to more effectively operate a particular filter having an internally positioned particle collecting element, where the particle collecting element is loaded with soot after a remaining portion of the particulate filter is loaded. Then, without substantially regenerating the remaining portion of the filter, the internal particle collecting element is selectively heated to selectively regenerate the particle collecting element thereby selectively removing soot from the particle collecting element. Since the particle collecting element comprises a material having a temperature-dependent electrical resistance, if indeed a sufficient amount of soot had been collected on the particle collecting element, then after its temperature is raised, the resistance will decrease due to the regeneration. Therefore, if such a response is identified, it may be possible to identify that the remaining portion of the filter is sufficiently full, and thus regeneration may be initiated of the remaining portion of the filter, such as by adjusting engine operation to increase exhaust temperature to or above a regeneration temperature. In this way, regeneration of the filter may be initiated, adjusted, or controlled, responsive to the performance of selective regeneration of only a portion of the filter, such as the particle collecting element portion, where particle collecting element is formed of a material with a temperature dependent resistance. Alternatively, the particle collecting element portion may be formed in different ways, for example with a material having a resistance dependent on the amount of soot stored thereon, for example.

As noted herein, in one example, the filter including the particle collecting element portion further includes a first filter portion forming a closed filter system and a second filter portion forming an open filter system, where the particle collecting element is positioned at least partially between the first and second filter portions, and where the particle collecting element, the first filter portion, and the second filter portion are all contained within a single housing 114. Further, the particle collecting element, the first filter portion, and the second filter portion may each be formed as different and distinct portions of the particulate filter, each occupying different physical space, although the various portions may be in face-sharing contact at one or more locations, such as at surface 116. Additionally, voids may be included in the particulate filter, such as between the particle collecting element and the first and second portions, such as at regions 118 and 120, in order to electrically isolate the particle collecting element from one or more of the first and second portions of the filter.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for operating a particle filter, the particle filter having at least one filter portion forming an open filter system, the method comprising:
heating a heatable particle collecting element that is an additional portion of the particle filter arranged downstream from and adjacent to the filter portion forming the open filter system and at least partially between the filter portion forming the open filter system and at least one other filter portion of the particle filter, the particle collecting element being formed of a material having a temperature-dependent electrical resistance and extending a shorter distance along a longitudinal axis of the particle filter than the filter portion forming the open filter system; and
measuring the electrical resistance of the particle collecting element by a sensor element to determine whether to regenerate the particle filter.

2. The method of claim 1, further comprising causing regeneration of the particle filter as a function of a measured electrical resistance of the particle collecting element.

3. The method of claim 2, wherein regeneration of the particle filter is caused if a decrease in the measured electrical resistance of the particle collecting element is determined.

4. The method of claim 3, wherein the particle filter comprises a further filter portion forming a closed filter system.

5. The method of claim 4, wherein the filter portion forming the open filter system is arranged in an edge region of the particle filter.

6. The method of claim 5, wherein the particle collecting element has a grid-like geometry.

7. A particle filter, comprising:
a first filter portion forming a closed filter system;
a second filter portion forming an open filter system in contact with a surface of the first filter portion; and
a heatable particle collecting element arranged downstream from and adjacently to the second filter portion, in contact with the surface of the first filter portion, and comprising a material having a temperature-dependent electrical resistance, wherein the particle filter is configured such that a flow resistance in the second filter portion is greater than a flow resistance of the first filter portion and the first filter portion, the second filter portion, and the heatable particle collecting element all contained within a single housing.

8. The particle filter of claim 7, wherein the second filter portion is arranged in an edge region of the particle filter.

9. The particle filter of claim 7, wherein the particle collecting element has a grid-like geometry.

10. The particle filter of claim 8, wherein the particle collecting element has a grid-like geometry.

11. The particle filter of claim 8, wherein the first filter portion includes a first section and a second section, the first section has a cross-sectional area smaller than a cross-sectional area of the second section, the surface is an outer surface of the first section, and the second filter portion is disposed to enclose a portion of the first section of the first filter portion.

12. A method for treating engine exhaust, comprising:
flowing exhaust through a first and second electrically isolated portion of a particulate filter, the first portion extending farther along a longitudinal axis of the particulate filter than the second portion;
selectively regenerating stored soot of the first portion to a greater extent than the second portion;
increasing or commencing regeneration of the second portion based on a soot storage response of the regeneration of the first portion.

13. The method of claim 12 wherein the first portion is positioned upstream of the second portion.

14. The method of claim 13 wherein the first portion is electrically heated to initiate the selective regeneration.

15. The method of claim 14 wherein regeneration of the second portion is increased or commenced by adjusting engine operation to increase exhaust temperature to or above a regeneration temperature.

16. The method of claim 15 further comprising sensing a change in electrical resistance of the first portion as the soot storage response of the regeneration of the first portion.

17. The particle filter of claim 11, wherein the particle collecting element is disposed to enclose another portion of the first section of the first filter portion.

18. The particle filter of claim 7, wherein the first filter portion extends farther along a longitudinal axis of the particle filter than the second filter portion.

19. The particle filter of claim 18, wherein the second filter portion extends farther along the longitudinal axis of the particle filter than the particle collecting element, the particle collecting element being positioned at least partially between the first filter portion and the second filter portion.

* * * * *